(12) United States Patent
Martilik

(10) Patent No.: US 7,966,500 B2
(45) Date of Patent: Jun. 21, 2011

(54) REMOTE CONNECTING AND SHIELDING POWER SUPPLY SYSTEM

(76) Inventor: Jeremiah Emmett Martilik, Carrollton, TX (US)

( * ) Notice: Subject to any disclaimer, the term of this patent is extended or adjusted under 35 U.S.C. 154(b) by 784 days.

(21) Appl. No.: 11/674,878

(22) Filed: Feb. 14, 2007

(65) Prior Publication Data

US 2007/0198866 A1 Aug. 23, 2007

Related U.S. Application Data

(60) Provisional application No. 60/775,248, filed on Feb. 21, 2006.

(51) Int. Cl.
G06F 1/00 (2006.01)
G06F 11/30 (2006.01)
G06F 21/22 (2006.01)
(52) U.S. Cl. .................. 713/300; 340/310.11; 375/219; 713/165; 713/192

(58) Field of Classification Search .................. 713/300, 713/165, 192; 340/310.11; 375/219
See application file for complete search history.

(56) References Cited

U.S. PATENT DOCUMENTS

| 6,026,502 | A  | * | 2/2000  | Wakayama | 714/38 |
| 2002/0041228 | A1 | * | 4/2002  | Zhang | 340/310.01 |
| 2002/0060624 | A1 | * | 5/2002  | Zhang | 340/310.01 |
| 2002/0080010 | A1 | * | 6/2002  | Zhang | 340/310.06 |
| 2006/0242686 | A1 | * | 10/2006 | Toda et al. | 726/3 |
| 2007/0022474 | A1 | * | 1/2007  | Rowett et al. | 726/11 |
| 2007/0086514 | A1 | * | 4/2007  | Lawrence | 375/219 |

FOREIGN PATENT DOCUMENTS

JP 2003023377 A * 1/2003

* cited by examiner

Primary Examiner — Vincent T Tran

(57) ABSTRACT

A remote connecting and shielding power supply system for receiving electricity and data from an electrical outlet and comprising a power line module embedded within the power supply for stripping data from electricity when received within the power supply and a single board computer also embedded within the power supply for shielding the motherboard of a device from unwanted data.

3 Claims, 1 Drawing Sheet

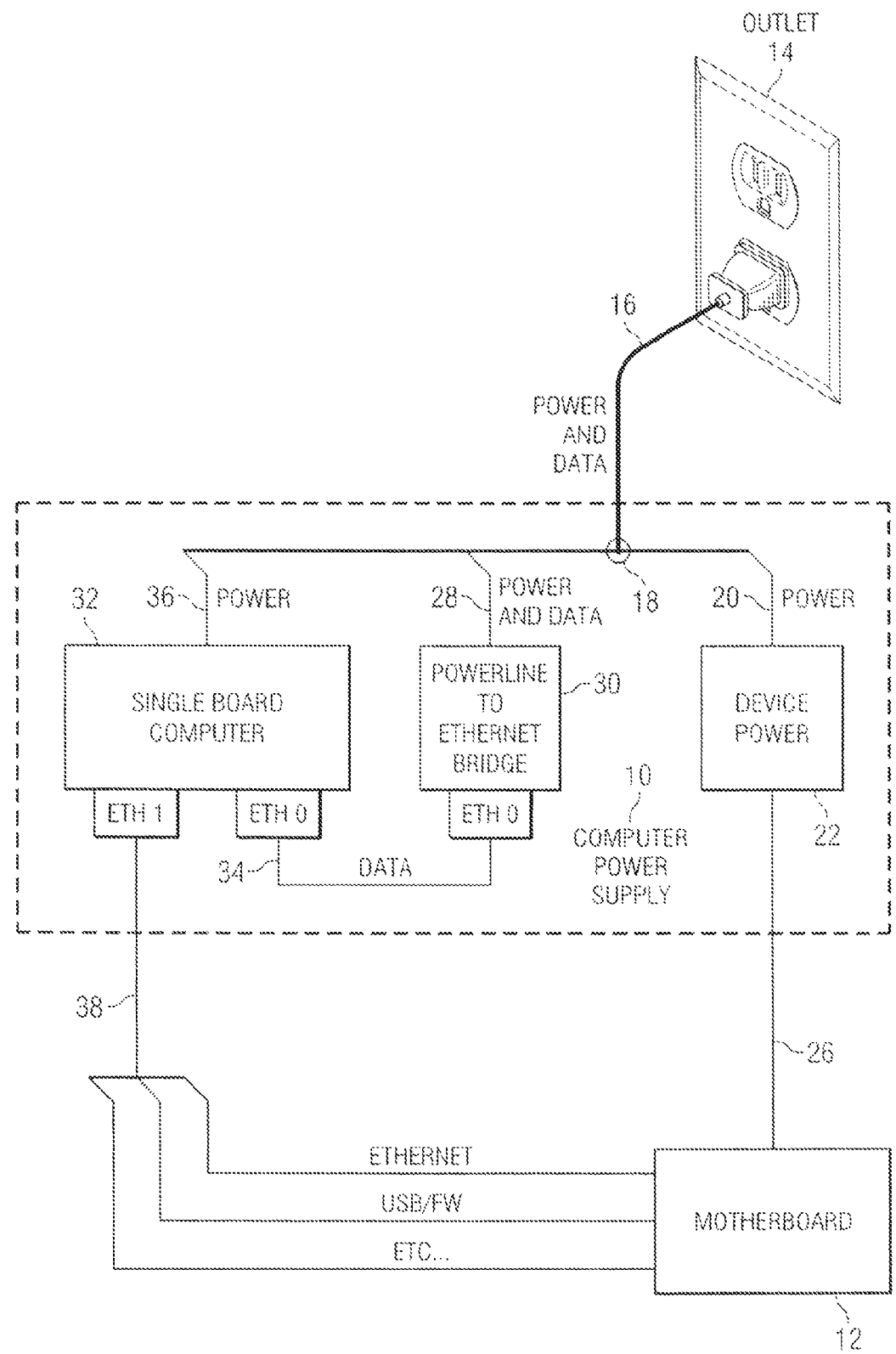

REMOTE CONNECTING AND SHIELDING POWER SUPPLY SYSTEM

CROSS-REFERENCE TO RELATED APPLICATION

Applicant claims priority based on provisional patent application Ser. No. 60/775,248 filed Feb. 21, 2006, the entire content of which is incorporated herein by reference.

TECHNICAL FIELD

This invention relates to power supply systems for devices such as computers and the like, and more particularly to power supply systems having embedded single-board computers for remotely connecting the devices to networks and for shielding the devices from unwanted programs that may enter the devices via the networks.

BACKGROUND AND SUMMARY OF THE INVENTION

The remote connection of computers and other devices such as stereos, alarm systems, digital video recorders and the like via local-area networks (LANs) and/or wide-area networks such as the internet (WANs) for the transfer of data is well known in the art. Further, it is well known that data is transferred among the devices in the LAN or WAN via telephone wires, cable lines, and, more recently, power lines.

The prior art teaches the possibility of creating a LAN using power lines within, for example, a house. There the connectivity is supplied to the house via traditional telephone or cable wires and into a modem. An external power-line module (XPLM) is connected to the modem with Category 5 cable at one end and then plugged into a standard power outlet at the other end. The XPLM transforms the data signal to a frequency that can be transferred via the power lines within the house. Devices can be connected to the LAN simply by using a XPLM to transform the data to a frequency that can be understood by the device.

It is also known in the prior art to embed a PLM within the power supply of a device so that a device within the network can simply be connected via a power cord. The embedded PLM converts the data traveling into the device via the power cord to a frequency that can be understood by the device.

It is also known in the prior art to transfer data within a WAN via power lines. This technology is known as broadband over power line (BPL). BPL technology requires that, once the signal is transferred from the WAN into the LAN, there is a PLM within the LAN to strip the data signal away from the power signal so that it may be understood by devices within the LAN.

The ability to connect computers and other devices within networks has brought about certain security issues for those connected therein. Computer programs called viruses and spyware are commonplace in connected to networks. These programs travel through the networks and into the motherboards of connected devices. Once inside the programs disrupt and in some cases destroy the functionality of the devices.

Software programs that can be loaded onto the motherboards of devices to shield the devices from the effects of viruses and spyware are well known in the art. These shielding software programs can consume large amount of available memory within the devices and reduce the overall functionality of the devices. Further, the shielding software programs only operate when the power to the devices is turned on. But because devices typically remain connected to the networks at all times there are large periods of time during which shielding software programs are not functioning.

The present invention allows a device to be connected to a network via one power cord while operating to shield the device even when the power to the device is not actuated. In accordance with its broader aspects the invention employs a single-board computer or server having a Linux® or Berkeley Standard Distribution™ operating system embedded within the power supply of a device so that the server continues to be powered, even when the power to the device is not actuated, as long as the power cord is connecting the power supply to a power outlet. The server is configurable to employ numerous software programs, including shielding programs, so that the device can be shielded even when the power to the device is not actuated.

The invention further employs a PLM embedded within the power supply of the device for stripping incoming data from the power signal so that it may be understood by the embedded server as well as for converting outgoing data signals to a frequency that can travel via power lines. Thus the server is enabled to send data transmissions to the motherboard of the device and shield the device from unwanted programs.

If a device employing the present invention operates within a LAN that is connected to a WAN via BPL, other devices employing the invention may be connected to the LAN simply by connecting them to a power outlet. The embedded server and PLM connect the device to the LAN through only the power cord.

Where the LAN is connected to a WAN, or to the internet via other traditional means it is necessary to have one XPLM within the LAN to allow devices employing the invention to be connected thereto. Devices employing the invention within the LAN would still have the benefit of added security.

BRIEF DESCRIPTION OF THE DRAWINGS

A more complete understanding of the present invention may be had by reference to the following Detailed Description when taken in connection with the accompanying Drawing, wherein:

FIG. 1 is a schematic of one embodiment of the invention.

DETAILED DESCRIPTION

FIG. 1 is a schematic illustrating one embodiment of the invention. There is a shown a power supply 10 and a motherboard 12 for a device such as a computer. The power supply 10 is connected to a power outlet 14 via a power cord 16. Both electricity and data travel on the power cord 16 which is received within the power supply 10 at a junction 18. In this embodiment the power cord 16 is the only cord that is necessary to power and connect the device to a network. This arrangement can and often does exist for numerous devices within a local area network (LAN) within, for example, a house.

In the first embodiment the LAN is connected to the internet via broadband over power line (BPL) so that external power line modules are not needed for the devices to receive data from the internet. Thus, any device within the LAN configured as shown in this embodiment would be connected to the LAN. However, the invention is also used in a second embodiment to receive data that is transferred to the devices via conventional methods such as broadband or ethernet. In the second embodiment an external power line is connected to the LAN at any power outlet and then any devices employing the invention is connected to the internet.

In the first embodiment a first line 20 carrying electricity connects the junction 18 to the main device power 22 which is in turn connected to the motherboard 12 via a second line 26.

A third line 28 carrying electricity and data connects the junction 18 to a power line module or a power line to ethernet bridge 30. The power line to ethernet bridge 30 strips the data from the transmission so that it can be sent to and understood by the embedded server 32 via a fourth line 34.

A fifth line 36 carrying electricity connects the junction 18 to the embedded server 32. The embedded server 32 receives data via a fourth line 34 from the power line to ethernet bridge 30. The embedded server 32 is configurable with various shielding programs and other programs as desired by the user. The embedded server 32 is powered as long as the power cord 16 is connected to the power outlet 14 and the programs loaded on the embedded server 32 run when it is powered. Thus loaded shielding programs are able to shield the motherboard 12 from unwanted programs that enter the power supply via the power cord 16. The embedded server sends data to the motherboard via a sixth line 38.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. For use in conjunction with a power supply a remote connecting and shielding power supply system comprising:
    a device having a power supply and a motherboard;
    a power cord for connecting the power supply of the device to an external power source, the power cord comprising means for transferring electricity and data into the power supply from the external power source;
    a power line module connected to the power cord and embedded within the power supply for stripping the data from the electricity;
    a single board computer located between and operatively connected to the power line module and the motherboard, said single board computer embedded within the power supply and having an operating system separate from the device wherein said single board computer runs independently of the device; and
    a user configurable means within the single board computer to analyze the data from the power line module and shield the motherboard from undesirable programs that enter the power supply through the power cord.

2. A remote connecting and shielding power supply system, comprising:
    an external power source;
    a power cord for connecting the power supply of the device to the external power source, the power cord comprising means for transferring electricity and data into the power supply from the external power source;
    a power line module connected to the power cord and embedded within the power supply for stripping the data from the electricity;
    a single board computer also embedded within the power supply and connected to the power line module on one end and connected to the motherboard on the other end, said single board computer having an operating system separate from the device enabling said single board computer to run independently of the device; and
    a server within the single board computer to analyze the stripped data received from the power line module said server configured with at least one user configurable program.

3. A remote connecting and shielding power supply system comprising:
    a device having a power supply and a motherboard;
    a cord connecting the power supply of the device to an external power source;
    a power line module connected to the power cord and embedded within the power supply for stripping data from the electricity;
    a single board computer embedded within the power supply and operatively connected to the power line module and to the motherboard, said single board computer having an operating system separate from the device whereby said single board computer runs independently of the device; and
    at least one user configurable program loaded on the single board computer to analyze the stripped data received by the single board computer from the power line module and parse out any undesired stripped data to create a filtered data set, and wherein said single board computer delivers said filtered data set to the motherboard.

* * * * *